United States Patent
Browne et al.

(10) Patent No.: US 9,623,813 B2
(45) Date of Patent: Apr. 18, 2017

(54) FIT AND FINISH METHODS

(71) Applicant: GM GLOBAL TECHNOLOGY OPERATIONS LLC, Detroit, MI (US)

(72) Inventors: Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 553 days.

(21) Appl. No.: 14/079,973

(22) Filed: Nov. 14, 2013

(65) Prior Publication Data

US 2015/0130110 A1 May 14, 2015

(51) Int. Cl.
| | |
|---|---|
| *B29C 65/00* | (2006.01) |
| *B60R 13/04* | (2006.01) |
| *B29C 65/70* | (2006.01) |
| *B29C 61/04* | (2006.01) |
| *B29C 61/06* | (2006.01) |
| *B29K 101/00* | (2006.01) |
| *B29L 31/30* | (2006.01) |

(52) U.S. Cl.
CPC .............. *B60R 13/04* (2013.01); *B29C 61/04* (2013.01); *B29C 61/06* (2013.01); *B29C 65/00* (2013.01); *B29C 65/70* (2013.01); *B29K 2101/00* (2013.01); *B29L 2031/3005* (2013.01)

(58) Field of Classification Search
None
See application file for complete search history.

(56) References Cited

U.S. PATENT DOCUMENTS

| | | | | |
|---|---|---|---|---|
| 5,120,175 | A * | 6/1992 | Arbegast | F16B 1/0014 29/447 |
| 5,388,617 | A * | 2/1995 | Sasaki | F16L 55/168 138/166 |
| 6,160,084 | A * | 12/2000 | Langer | A61L 27/18 528/176 |
| 6,773,535 | B1 * | 8/2004 | Wetzel | B29C 65/76 156/247 |
| 7,938,923 | B2 * | 5/2011 | Hood | B29C 35/0272 138/97 |
| 8,763,231 | B2 * | 7/2014 | Rule | F16B 1/0014 29/447 |
| 8,870,236 | B2 * | 10/2014 | Rule | F16L 21/00 285/321 |

(Continued)

FOREIGN PATENT DOCUMENTS

| | | | |
|---|---|---|---|
| JP | 57182597 | * | 11/1982 |
| JP | 02163594 | * | 6/1990 |

(Continued)

*Primary Examiner* — Edmund Lee
(74) *Attorney, Agent, or Firm* — Dierker & Kavanaugh, P.C.

(57) ABSTRACT

Fit and finish methods using shape memory polymers ("SMP") are disclosed herein. In an example of the fit and finish method, a first part and a second part are positioned adjacent to one another such that a shape memory polymer in a temporary shape is adjacent to a gap between the first part and the second part. The SMP is heated to a switching temperature of the SMP, which causes the SMP to initiate conversion to a permanent shape so that the SMP extends into the gap to close the gap between the first part and the second part.

17 Claims, 3 Drawing Sheets

(56) References Cited

U.S. PATENT DOCUMENTS

| | | | |
|---|---|---|---|
| 2001/0018120 A1 | 8/2001 | Murakami et al. | |
| 2002/0043736 A1* | 4/2002 | Murakami | B29C 43/003 264/45.1 |
| 2003/0170092 A1* | 9/2003 | Chiodo | F16B 1/0014 411/82.5 |
| 2006/0046433 A1* | 3/2006 | Sterrett | H01L 21/02013 438/459 |
| 2008/0027199 A1* | 1/2008 | Mazurek | A61L 15/24 528/10 |
| 2008/0314510 A1* | 12/2008 | Hood | B29C 35/0272 156/221 |
| 2009/0061188 A1* | 3/2009 | Browne | B32B 7/045 428/217 |
| 2009/0277579 A1* | 11/2009 | Marelli | B29C 65/004 156/293 |
| 2012/0017422 A1* | 1/2012 | Rule | F16B 1/0014 29/525.05 |
| 2012/0211119 A1* | 8/2012 | Rule | F16L 21/00 138/155 |

FOREIGN PATENT DOCUMENTS

| | | | |
|---|---|---|---|
| JP | 07127141 | * | 5/1995 |
| WO | WO2011128328 | * | 10/2011 |
| WO | WO2013006442 | * | 1/2013 |

* cited by examiner

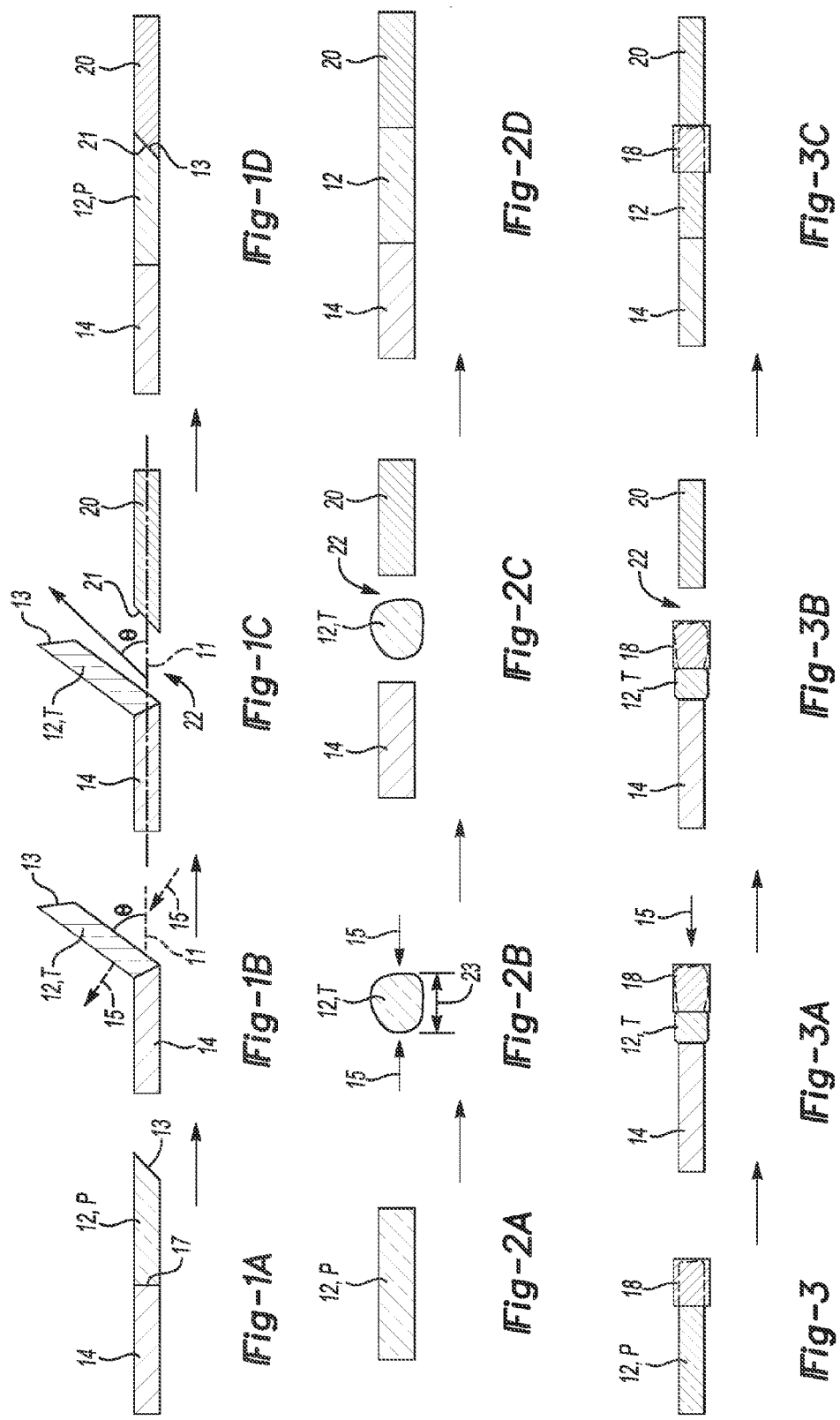

FIT AND FINISH METHODS

BACKGROUND

In some instances, fit and finish methods are utilized to eliminate gaps or gap width variations between vehicle parts (e.g., vehicle interior and exterior parts), which may be caused, for example, by tolerance stackup between parts, attachment mechanisms, part positioning prior to attachment, etc. In other instances, fit and finish methods are utilized to align surfaces or to cause surfaces of adjacent parts to be flush with each other. Fit and finish methods can improve the quality and can also have practical consequences (e.g., reduction in air leaks and/or water leaks, elimination of wind noise-generating surface gaps and misalignments (flow trips, etc.). Many current fit and finish methods involve the manual distortion of surface panels or other visible interior or exterior parts. Manual distortion may be undesirable as a common practice as it may be difficult, may result in surface appearance anomalies, and, in general, may require considerable skill depending upon the material of the part, the shape of part, the amount of distortion that is required to account for factors such as tolerance stackup, and/or the visibility of the part.

SUMMARY

Fit and finish methods are disclosed herein. In an example of the fit and finish method, a first part and a second part are positioned adjacent to one another such that a shape memory polymer (SMP) in a temporary shape is adjacent to a gap between the first part and the second part. The SMP is heated to a switching temperature of the SMP, which causes the SMP to initiate conversion to a permanent shape so that the SMP extends into the gap to close the gap between the first part and the second part. In another example of the fit and finish method, an SMP in its temporary shape is heated to a switching temperature of the SMAP to initiate a conversion of the SMP to a permanent shape. While the conversion is taking place, the SMP is installed between a first part and a second part so that when the SMP attempts to convert to the permanent shape, the SMP fills a gap between the first and second parts.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 1A through 1D are cross-sectional views which together illustrate one example of a fit and finish method involving an SMP, including steps for setting a temporary shape of the SMP;

FIGS. 2A through 2D are cross-sectional views which together illustrate another example of the fit and finish method involving the SMP, including steps for setting a temporary shape of the SMP;

FIG. 3 is a cross-sectional view of an SMP in its permanent shape, where a portion of the SMP resides within a cap;

FIGS. 3A through 3C are cross-sectional views which together illustrate examples of the fit and finish method involving the SMP of FIG. 3;

DETAILED DESCRIPTION

Figure 4:
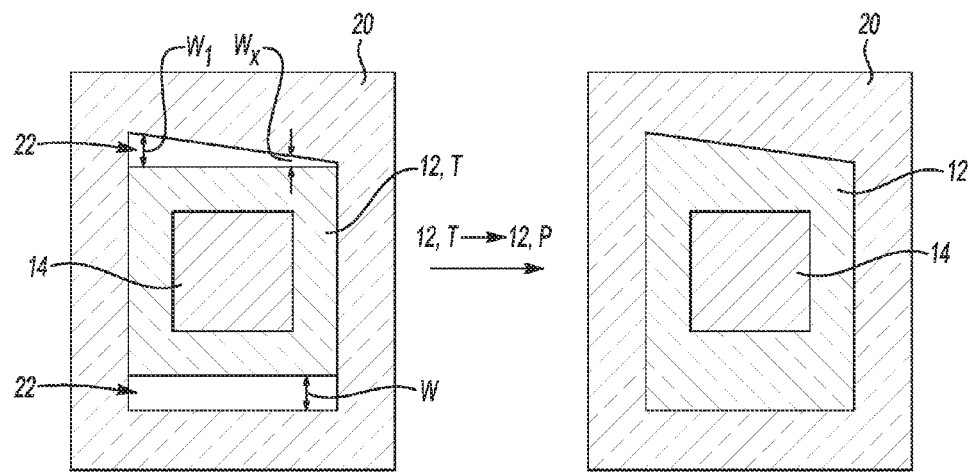
FIG. 4 is a cross-sectional view of another example of the fit and finish method involving an SMP covering a perimeter of a part.

Examples of the fit and finish methods disclosed herein utilize shape memory polymers ("SMP") to eliminate gaps or spaces between, for example, various visible interior and/or exterior vehicle parts. As will be discussed further below, the SMP is able to convert between a temporary shape and a remembered, permanent shape. When in the permanent shape and heated to a certain temperature, the SMP becomes pliable enough so that it can be molded or otherwise conformed under applied external pressure/forces into a deformed (i.e., temporary) shape. The temporary shape may be locked in when the SMP is cooled to a temperature below the lowest switching temperature of the SMP (described in more detail below) while remaining subjected to the deforming pressure/loading forces. In the examples disclosed herein, the SMP in the temporary shape is attached to a part being installed, is used as a coating on a part that is installed or is being installed, or is positioned in a gap between two parts. After the SMP is in place or while the SMP is being installed, the SMP in its temporary shape is reheated, which will initiate the reversion of the SMP to its permanent shape (i.e., the SMP will try to recover the permanent shape depending on the nature and magnitude of an external force to which it is subjected, or will succeed in recovering the permanent shape if there are no force(s) constraining the recovery). In attempting to revert or reverting to the permanent shape, the SMP will fill any gaps or spaces between the parts if this filling is achieved during the attempt of the SMP to fully recover its permanent shape.

The term "part" as used herein refers to any inanimate objects for which a fit and finish is desired and/or necessary. More specifically, in one example, the part is an internal or external vehicle component. Examples of suitable internal vehicle components include the instrument panel, parts of the instrument panel (e.g., glove box, ashtray, vents, etc.), the center console, and other interior panels (e.g., on vehicle doors and between coverings on vehicle pillars, roof liners, rear hat shelf, arm rests, map pockets, and vehicle doors). Examples of suitable external vehicle components include a windshield, various sheet metal and/or composite body panels, pillars, swing panels (such as hoods, doors, trunk and rear hatch lids, fuel filler doors, etc.), roof sections, etc.

The term "gap" refers to any space that is present between two parts when they are installed, whether or not their position and alignment when installed corresponds to that which is desired or achievable with the in-use installation techniques. A single gap may exist between the parts, or multiple gaps may exist between the parts. A single gap may have a consistent width or height between the two parts, or may have a width or height that varies between the two parts. The term "space" may be used interchangeably with the term gap.

In general, the SMP is deformable from the permanent shape to the temporary shape, and can revert back to the permanent shape in response to an external stimulus (e.g., heat of a specific temperature). The permanent shape of the SMP refers to a memorized shape of the polymer. The temporary shape of the SMP refers to a deformed, non-memorized shape of the polymer.

The SMP includes a mix of two different polymer components (reactants) having different glass transition temperatures ($T_g$). The polymer component with the lower glass transition temperature has a significantly higher modulus (which, in some examples, may be similar to the modulus of nylon) than the modulus of the polymer component with the higher glass transition temperature. At temperatures below the lower glass transition temperature, the SMP is in a high modulus (i.e., stiffness) state. When the SMP is heated to any temperature between the lower and higher glass transition temperatures, the SMP enters a lower modulus (i.e., stiffness) state. In the lower modulus state, the SMP exhibits the lower modulus of its polymer component with the higher glass transition temperature. It is to be understood a "switching temperature" of the SMP is the temperature at which the SMP becomes substantially easily deformable. When at a temperature slightly above the switching temperature (but not above the higher glass transition temperature) and, in combination with a force (as will be described in further detail below), the SMP may be switched from its permanent shape into its temporary shape. It is to be understood that when the SMP is heated to deform the polymer from the permanent shape, the heating should not melt or degrade the SMP, i.e. the temperature of the SMP should not be raised above the glass transition temperature of the polymer component with the higher of the two glass transition temperatures. In the examples disclosed herein, when the SMP in the locked temporary shape is heated to a temperature above the switching temperature, the SMP reaches its low modulus state and may spontaneously revert from its temporary shape back into its permanent shape (which will also be described in further detail hereinbelow).

The selection of the different polymer components in the SMP based on their different glass transition temperatures may depend, at least in part, upon whether the SMP participates in supporting one or both of the parts. To avoid any movement of the parts once installed due to softening of the SMP, the switching temperature is selected to be greater than the temperature experienced during use of the object in which the parts and the SMP are installed. In examples, the switching temperature may be selected to be about 85° C. for interior applications and about 110° C. for exterior applications. As another example, if the SMP is on or between exterior sheet metal parts in prior to the body white going through a paint oven, then the switching temperature should be above 150° C. If the SMP does not participate in holding the abutting parts in position, i.e., if the SMP is just used to fill gap(s) and not to support the parts, then the switching temperature can be substantially lower. Although, in these instances, the switching temperature should still be high enough to avoid inadvertent deformation and permanent set if subjected to a load (e.g., cargo pressing against the surface). Occasional heating of the SMP above its switching temperature may not be deleterious as long as the SMP is not supporting parts. In fact, occasional heating will allow the SMP to refill any gaps that may have opened up during vehicle usage, due to, for example, torqueing of the body or thermal expansion/contraction of the abutting parts. In any instance, however, the SMP should be selected so that its higher glass transition temperature is above the temperature encountered in the application space so that the permanent shape is not lost.

The thermally-activated SMPs disclosed herein exhibit the following properties: i) their elastic modulus changes substantially (e.g., by one to three orders of magnitude) across a narrow transition temperature range, ii) this transition temperature range can be adjusted to lie within a wide range that includes the interval 0° C. to 150° C. by varying the composition of the polymer, and ii) there is a finite rubbery plateau in the material's elastic response at temperatures above the transition range where the modulus remains fairly constant. In addition to the elastic modulus, properties such as permeability to moisture, refractive index, etc. also exhibit a change across the transition temperature range.

Depending on the nature of the polymer morphology, a wide variety of SMPs can be formed. Some SMPs are classified by the natures of the cross-links, such as thermoplastic polymers or thermoset polymers. In at least some of the examples disclosed herein, the SMP is not a foam. Examples of suitable SMPs for the examples disclosed herein include olefin-based systems, acrylate-based systems, styrene-based systems, polyester-based systems, acrylonitrile-butadiene-styrene-based blends, or epoxy-based systems. Any of these materials may also include fillers (e.g., inorganic fillers) or other active materials (such as, e.g., shape memory alloy wires, magneto-responsive fillers, electroactive fillers, photo-responsive organic dyes, and/or the like). It is to be understood that fillers may be reinforcing fillers (which improve the mechanical properties of the SMP), active fillers such as, e.g., magnetic or electrically conductive particles (which may contribute to the triggering mechanism for the shape memory effect), or active fillers that may contribute to improvement of other physical properties of the SMP such as, e.g., its thermal conductivity. Also, the SMPs may include other additives, such as UV blockers, plasticizers, colorant dyes, or other additives suitable for a particular application.

Forming the SMP into its permanent shape may be accomplished following traditional techniques, such as polymer casting, extrusion, injection molding, etc. The permanent shape may be based, at least in part, upon the size and shape of the gap to be filled. Flushness of adjacent surfaces (e.g., part 1—SMP—part 2) may be taken into consideration when forming the permanent shape, so that the appearance as well as performance of the parts having the SMP filling the gap is enhanced. It is to be understood that the permanent shape of the SMP has been set prior to using it in the fit and finish methods disclosed herein. Therefore, forming the SMP in its permanent shape it is not shown in the figures.

As mentioned above, when the SMP in its permanent shape is heated to the switching temperature, the SMP enters the lower modulus, lower stiffness state and becomes more readily deformable, i.e., the elastic modulus of the polymer is low and the material can be stretched to high strains (e.g., up to 300%). In this state, the SMP can be conformed or manipulated into shapes that can be significantly different from the permanent shape using some external force(s). While the deformed shape is held, the SMP can be cooled back to a temperature below the switching temperature. Cooling in this manner sets or locks in the deformed shape as the temporary shape.

Subsequent reheating of the SMP (while it is in its temporary shape) to the switching temperature will cause the SMP to attempt to recover the permanent shape. In some of the examples disclosed herein, the complete recovery of the SMP to the permanent shape will close the gap between two parts. In other examples, the complete recovery of the SMP to the permanent shape will be blocked by some obstruction (e.g., one or both of the two parts), but the gap will be closed.

Various examples of the fit and finish methods utilizing SMPs which fill the gaps or spaces between parts are illustrated in FIGS. 1 through 6. The SMP is generally used as an edge or perimeter trim piece or as a separate gap insert. In addition to the examples that are illustrated, it is to be understood that the parts and the gap-filling SMP between the parts may be components of some other object. For example, the parts and the gap-filling SMP between the parts may be installed within a larger part of a vehicle, may be positioned between or adjacent to other parts of the vehicle, or may be utilized in some other configuration with other parts of the vehicle.

The example of the fit and finish method shown in FIGS. 1A through 1D illustrates the setting of the temporary shape T of the SMP 12 (FIG. 1B), the positioning of the parts 14, 20 such that the SMP 12, T is adjacent to a gap 22 between the parts 14, 20 (FIG. 1C), and the conversion of the SMP 12 from its temporary shape T to its permanent shape P to fill the gap 22 (FIG. 1D).

Referring specifically to FIG. 1A, the SMP 12 in its permanent shape P is shown attached to the first part 14. The SMP 12, P may be attached to all or a portion of the perimeter of the first part 14, depending upon the application in which the SMP 12 and the part 14 are to be used. For example, if the gap 22 is present between two ends (e.g., end 17 of part 14 and end 21 of part 20), the SMP 12, P may be attached to one of the ends 17 or 21. As another example, the SMP 12, P may be attached to the entire perimeter of one of the parts 14, 20 when the gap 22 is present between all edges of the parts 14, 20 (see FIG. 5). As illustrated in FIG. 1A, the SMP 12, P is attached to the end 17 of the part 14. This end 17 faces the gap 22 between the parts 14, 20 when the parts 14, 20 are positioned adjacent to one another when installed or put into an operable position (FIG. 1C).

The SMP 12, P may be attached to the part 14 (or part 20) via any suitable mechanism, such as an adhesive. In other examples, the SMP 12, P may be attached to the part 14 (or part 20) by molding the SMP 12, P to the part 14 either i) by cohesive interfacial bonds between SMP 12, P and the part 14 or ii) through molded on mechanical interlock, with texture or other geometric features (such as indents and cavities, protrusions, and through holes) on or adjacent to the perimeter of the part 14. In an example, mechanical interlock can be created by molding the SMP 12, P to the part perimeter; heating and softening the SMP 12, P; pressing the SMP 12, P against the perimeter so as to conform the SMP 12, P to and create mechanical interlock with the part 14; and subsequent cooling. In another example, mechanical interlock can be created by pressing the SMP 12, P in its higher modulus state against the perimeter of the part 14 to create a snapfit type of connection.

The SMP 12 in its permanent shape P (as shown in FIG. 1A) is then exposed to at least its switching temperature, which renders the SMP 12 in its deformable, lower modulus state. Since in this example the SMP 12, P is attached to the part 14, the switching temperature should not melt, degrade, or otherwise deteriorate the operability and/or functionality of the part 14. Accordingly, the heating of the SMP 12, P in this example may be accomplished at the switching temperature of the SMP 12, P and below at least a melting or degradation temperature of the part 14 or a component of the part 14 having the lowest melting or degradation temperature of all the part components. In instances where the part 14 is sensitive to temperature, the selection of the SMP 12 will be such that the temperature at which the SMP 12 is heated to switch it from its permanent shape P to its temporary shape T does not deleteriously affect and thus accommodates the temperature sensitivity of the part 14.

As shown in FIG. 1B, in addition to heating the SMP 12, a force 15 is applied to conform the SMP 12 to the desired temporary shape T. In some instances, the heat and the force 15 are applied sequentially, and in other instances, the heat and the force 15 are applied simultaneously.

In an example, the force 15 may result from a physical object that pushes or pulls the SMP 12 into the desired temporary shape T. In another example, the force 15 may result from pressure being applied to the SMP 12. For instance, the SMP 12 (which, in this example is attached to the part 14) may be heated to its switching temperature and then may be introduced into a forming station. In the forming station, the SMP 12 may be placed on a component having the desired temporary shape T and then a pressure differential may applied across the SMP plane so that it conforms against the exterior of the component. The pressure differential may be accomplished by applying pressure on one side of the SMP 12, or by applying pressure to a side of the SMP 12 furthest from the component and pulling a vacuum from the side of the SMP 12 facing the component, or by alone pulling a vacuum from the side of the SMP 12 facing the component. In an example, the amount of pressure applied to the SMP 12 ranges from about 4 bars to about 8 bars. In the examples involving pressure to generate the force 15, it is to be understood that the SMP 12 is effectively stretched onto the component via the force 15 from the pressure and/or vacuum which is sufficient to deform the heated SMP 12 into its temporary shape T.

As shown in FIGS. 1B and 1C, the temporary shape T of the SMP 12 is bent at an angle $\Theta$ from an axis 11. In this example, as shown in FIG. 1C, the axis 11 is an axis of the gap 22 which extends laterally through the two parts 14, 20. It is to be understood that the axis 11 could be altered depending upon the shape and positioning of the parts 14, 20 and the gap 22.

The angle $\Theta$ may be any angle greater than zero that enables the SMP 12 to be effectively bent out of the way so that the parts 14, 20 can be properly installed. How far the SMP 12 could be bent is dependent, at least in part, on the order of the steps in the assembly process. Bending the SMP 12 through an angle of 90 degrees or greater would allow the parts 14, 20 to be installed in any order and either through horizontal or vertical movement. If there are restraints on vertical movement during assembly, then the part 14 with the SMP 12 must be installed after the adjacent (i.e., across the gap 22) part 20 so that the SMP 12 overhangs the gap 22. In this particular example, to minimize the vertical clearance required the angle $\Theta$ should be less than 90 degrees (e.g., as shown in FIGS. 1B and 1C).

In this example, it is to be understood that the localized strain in the hinge point of the SMP 12 must be within the elastic limit which varies with SMP formulation but which can be as high as 300%.

Once the SMP 12 has been changed from its permanent shape P into its temporary shape T, the temporary shape T of the SMP 12 may be fixed or set by cooling the SMP 12 to a temperature below its lowest switching temperature (i.e., the lower glass transition temperature of the SMP 12). It is to be understood that the force 15 is maintained while cooling occurs. In some instances, cooling may be accomplished by removing the heat and allowing the SMP 12 to reach room temperature. In other instances, the SMP 12 may be cooled more rapidly by air cooling, liquid nitrogen cooling, or other suitable means. It is to be understood that any temperature below the lowest switching temperature will suffice to set the SMP 12 into the temporary shape T, including temperatures above or below room temperature. In an example, the SMP 12 is desirably cooled to a temperature ranging from about at least 10° C. to about 20° C. below the lowest switching temperature (i.e., the lower glass transition temperature of the SMP 12).

After the temporary shape T is set, the two parts 14, 20 are positioned adjacent to one another such that the SMP 12 in its temporary shape T is adjacent to the gap 22 between the parts 14, 20. FIG. 1C is a schematic illustration of the two parts 14, 20 and the SMP 12, T after the parts 14, 20 have been installed in their operable positions. In any of the examples disclosed herein, the SMP 12, T is positioned with respect to the gap 22 so that when the conversion to the permanent shape P is initiated, the SMP 12 will fill the gap 22. In the example of FIG. 1C, the SMP 12, T is positioned in the gap 22 when part 14 is installed in its respective position, Once the parts 14, 20 and the SMP 12, T are installed, conversion of the SMP 12 from its temporary shape T to its permanent shape P is initiated. Initiating conversion to the permanent shape P may be achieved by heating the SMP 12 in its temporary shape T to a temperature above its switching temperature. When SMP 12 is heated to this temperature, the polymer 12 reaches its lower modulus and deformable state and reverts back to its permanent shape P. It is to be understood that because the reversion of the SMP 12 from its temporary shape T back into its permanent shape P is due, at least in part, to stored energy within the polymer network, a force 15 is generally not required to complete the reversion.

In some of the examples disclosed herein, the SMP 12 may complete the reversion to the permanent shape P in order to fill or close the gap 22 (as shown in FIG. 1D). In this example, the permanent shape P has a beveled edge 13 that conforms to a beveled edge 21 of a mating surface of the part 20. Upon conversion from the temporary shape T to the permanent shape P, the edges 13, 21 come in contact. The SMP 12, P forms a seam between the first and second parts 14, 20.

In the example of FIGS. 1A through 1D, initiation of the reversion of the SMP 12 back to the permanent shape P takes place after the parts 14, 20 and the SMP 12, T are installed, It is to be understood however, that heating of the SMP 12 to initiate the conversion back to the permanent shape P may take place before the part 14 and the SMP 12, T are installed, and while the conversion is taking place, the part 14 and the SMP 12, T can be installed. The installation may be accomplished using a robotic arm. In this example, it is to be understood that the installation may have to occur relatively rapidly and/or heat may have to be continuously supplied during the installation in order to avoid cooling of the SMP 12 prior to completing the conversion to the permanent shape P or prior to closing the gap 22.

In other examples of the method, the SMP 12 will not complete the conversion to the permanent shape P, but rather the part(s) 14 and/or 20 may obstruct the complete conversion to the permanent shape P. In these examples, the permanent shape P is larger than the gap 22, and when the SMP 12 attempts to revert from the temporary shape T (which is narrower than the gap 22) to the permanent shape P, the SMP 12 will come into contact with the part(s) 14 and/or 20 before completing the reversion. The part(s) 14 and/or 20 prevent the SMP 12 from fully reverting back to the permanent shape P, but the partial reversion of the SMP 12 tightly fills any gaps 22. In these examples, the partial reversion results in a new shape for the SMP, and this new shape may be locked in by allowing the SMP 12 to cool below the switching temperature. An example of the partial reversion to the permanent shape P is shown in FIGS. 2A through 2D.

Referring specifically to FIG. 2A, the SMP 12 in its permanent shape P is shown. In this example, the SMP 12 may be a lace strip, and the permanent shape P is wider than the gap 22 that the SMP 12 will ultimately fill.

The SMP 12 in its permanent shape P (as shown in FIG. 2A) is then exposed to its switching temperature, which renders the SMP 12 in its deformable, lower modulus state. As shown in FIG. 2B, in addition to heating the SMP 12, forces 15 (such as those previously described) are applied to conform the SMP 12 to the desired temporary shape T. In this example, the SMP 12 is squished (i.e., narrowed in the lateral dimension) so that the temporary shape T has a dimension 23 in the cross gap direction that is narrower than both the same dimension of the permanent shape P and the dimension of the gap 22. This may be desirable so that the SMP 12 in its temporary shape T can readily be inserted into the gap 22.

Once the SMP 12 has been changed from its permanent shape P into its temporary shape T, the temporary shape T of the SMP 12 may be fixed or set by cooling the SMP 12 to a temperature below its lowest switching temperature (i.e., the lower glass transition temperature of the SMP 12). Cooling may be accomplished as previously described.

After the temporary shape T is set, the SMP 12 in its temporary shape T is inserted into the gap 22 between the two parts 14, 20, as shown in FIG. 2C. The two parts 14, 20 may have already been installed. The installation process may be manual or automated (e.g., via a robotic arm, not shown). In an example, the robotic arm may position and hold the SMP 12 in the gap 22 until the gap 22 is closed.

Once the SMP 12, T is installed in the gap 22, conversion of the SMP 12 from its temporary shape T to its permanent shape P is initiated by heating the SMP 12 in its temporary shape T to a temperature above its switching temperature. As previously described, when SMP 12 is heated to this temperature, the polymer 12 reaches its lower modulus and deformable state and attempts to revert back to its permanent shape P. In this example, since the permanent shape P is wider than the gap 22, the SMP 12 will come into contact with the parts 14 and 20 prior to completely reverting to the permanent shape P. The parts 14 and 20 will obstruct the complete reversion and a tight seal will be formed between the SMP 12 and the respective parts 14 and 20. The new shape of the SMP 12 within the gap 22 may be set by lowering the temperature below the switching temperature (i.e., below the lower of the SMP glass transition temperatures).

In the example of FIGS. 2A through 2D, initiation of the reversion of the SMP 12 back to the permanent shape P takes place after the parts 14, 20 and the SMP 12, T are installed. It is to be understood however, that heating of the SMP 12 to initiate the conversion back to the permanent shape P may take place before the SMP 12, T is inserted into the gap 22, and while the conversion is just starting to take place, the SMP 12, T can be quickly inserted into the gap 22. The insertion may be accomplished using a robotic arm. In this example, it is to be understood that the insertion may have to occur relatively rapidly and/or heat may have to be continuously supplied during the insertion in order to avoid cooling of the SMP 12 prior to closing the gap 22.

In still other examples of the method, the SMP 12 is a foam, a band, or a lace strip having a cap (shown as 18 in FIG. 3) attached thereto. In some examples, the cap 18 may be hollow so that at least a portion of the SMP 12 resides within the cap 18. In these examples, the cap 18 fits securely over a portion of the SMP 12 in its permanent shape P. This example is shown in FIG. 3.

The cap 18 may be made of any material that has an elastic modulus at least as great as that of nylon. The cap 18 has a sufficient thickness so that it will not be significantly distorted by the attempt of the SMP 12 to resume its permanent shape P upon heating above its switching/transition temperature. In some instances, the cap is adjustable, and thus has sufficient flexibility along its length so that it can bend so as to fill gaps of gradually varying width and gradual global bends. Suitable metal materials for the cap 18 include stainless steel, titanium, aluminum and alloys thereof, and various compositions of shape memory alloys that have transformation temperatures above the switching/transition temperature of the particular SMP 12 being used. Suitable nonmetallic materials suitable for the cap 18 include carbon fiber, E glass, S glass, para-aramid synthetic fiber (e.g., KEVLAR®), and plastics, such as nylon, acetal resins (e.g., DELRIN®), etc.

Examples of the fit and finish method using the SMP 12 and cap 18 of FIG. 3 are shown in FIGS. 3A through 3C. FIG. 3A illustrates the forming and setting of the temporary shape T. This may be accomplished as previously described, by heating the SMP 12 in its permanent shape P to the switching temperature and applying a suitable force(s) 15 to reshape the deformable SMP; and while continuing to apply the force(s) 15, cooling to below the lower glass transition temperature of the SMP 12.

When the SMP 12 is a foam, setting the temporary shape T may involve pushing the cap 18 towards the SMP 12 (which may also have some force exerted thereon in the opposite direction) so that at least some of the deformable foam squishes (compresses) into the cap 18. In this example, the dimension of the SMP 12 in the gap 22 filling the cross gap direction is referred to as the height. The height of the SMP 12 in the temporary shape T (including the height of the cap 18) is smaller than a height of the permanent shape P (including the height of the cap 18). The height of the SMP 12 in the temporary shape T (including the height of the cap 18) is also smaller than the height of the gap 22 between the parts 14, 20 so that the SMP 12 and the cap 18 can fit into the gap 22.

When the SMP 12 is a band or lace strip with the cap 18 attached to an end thereof, setting the temporary shape T may involve pushing the cap 18 toward a part (e.g., part 14 to which the SMP 12 is attached) or pushing the cap 18 and an opposed end of the SMP 12 towards each other. In these examples, the height of the SMP 12 in the temporary shape T (including the height of the cap 18) is smaller than a height of the permanent shape P (including the height of the cap 18). The height of the SMP 12 in the temporary shape T (including the height of the cap 18) is also smaller than the height of the gap 22 between the parts 14, 20 so that the SMP 12 and the cap 18 can fit into the gap 22.

As shown in FIG. 3A, the SMP 12 in its temporary shape T and having the cap 18 thereon is attached to an end 17 of one of the parts 14. The attachment of the SMP 12 to the part 14 may take place before or after the temporary shape T is set. If the SMP 12 in its permanent shape P is attached to the part 14 and then the temporary shape T is set, the switching temperature should not melt, degrade, or otherwise deteriorate the operability and/or functionality of the part 14. Accordingly, the heating of the SMP 12, P in this example may be accomplished at the switching temperature of the SMP 12, P and below at least a melting or degradation temperature of the part 14 or a component of the part 14 having the lowest melting or degradation temperature of all the part components.

After the temporary shape T is set, the two parts 14, 20 are positioned adjacent to one another such that the SMP 12 in its temporary shape T and having the cap 18 attached thereto is adjacent to the gap 22 between the parts 14, 20. FIG. 3B is a schematic illustration of the two parts 14, 20 and the SMP 12, T and cap 18 after the parts 14, 20 have been installed in their operable positions. In the example of FIG. 3B, the SMP 12, T and the cap 18 are positioned in the gap 22 when part 14 is installed in its respective position.

Once the parts 14, 20 and the SMP 12, T are installed, conversion of the SMP 12 from its temporary shape T to its permanent shape P is initiated. Initiating conversion to the permanent shape P may be achieved as previously described. In this example, since the SMP 12, T is attached to the end 17 of the part 14 and the permanent shape P is greater than the dimension (e.g., width) of the gap 22, the cap 18 will be moved when the reversion is initiated. The cap 18 will come into contact with the part 20 prior to the SMP 12 completely reverting to the permanent shape P. In this example, the part 20 will obstruct the complete reversion and a tight seal will be formed between the SMP 12, the cap 18, and the respective parts 14 and 20. The new shape of the SMP 12 within the gap 22 may be set by lowering the temperature below the lowest switching temperature (i.e., below the lower of the SMP glass transition temperatures).

In another example, the SMP 12 in its temporary shape T and having the cap 18 thereon is not attached to either of the parts 14, 20. In this example, the SMP 12 in its temporary shape T and having the cap 18 thereon is installed between the part 14, 20 so that when the reversion to the permanent shape P is initiated, the SMP 12 is moved into contact with one of the parts 14 and the cap 18 is moved into contact with the other of the parts 20 to close the gap 22. In this example, a robotic arm may hold the SMP 12 in position until it and the cap 18 securely contact the respective parts 14, 20.

Figure 6:
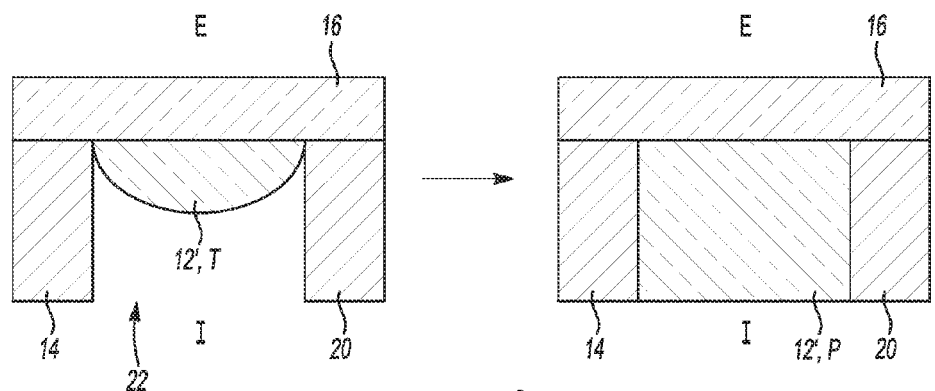
FIG. 6 is a cross-sectional view of still another example of the fit and finish method in which the SMP is used as a coating.
Figure 5:
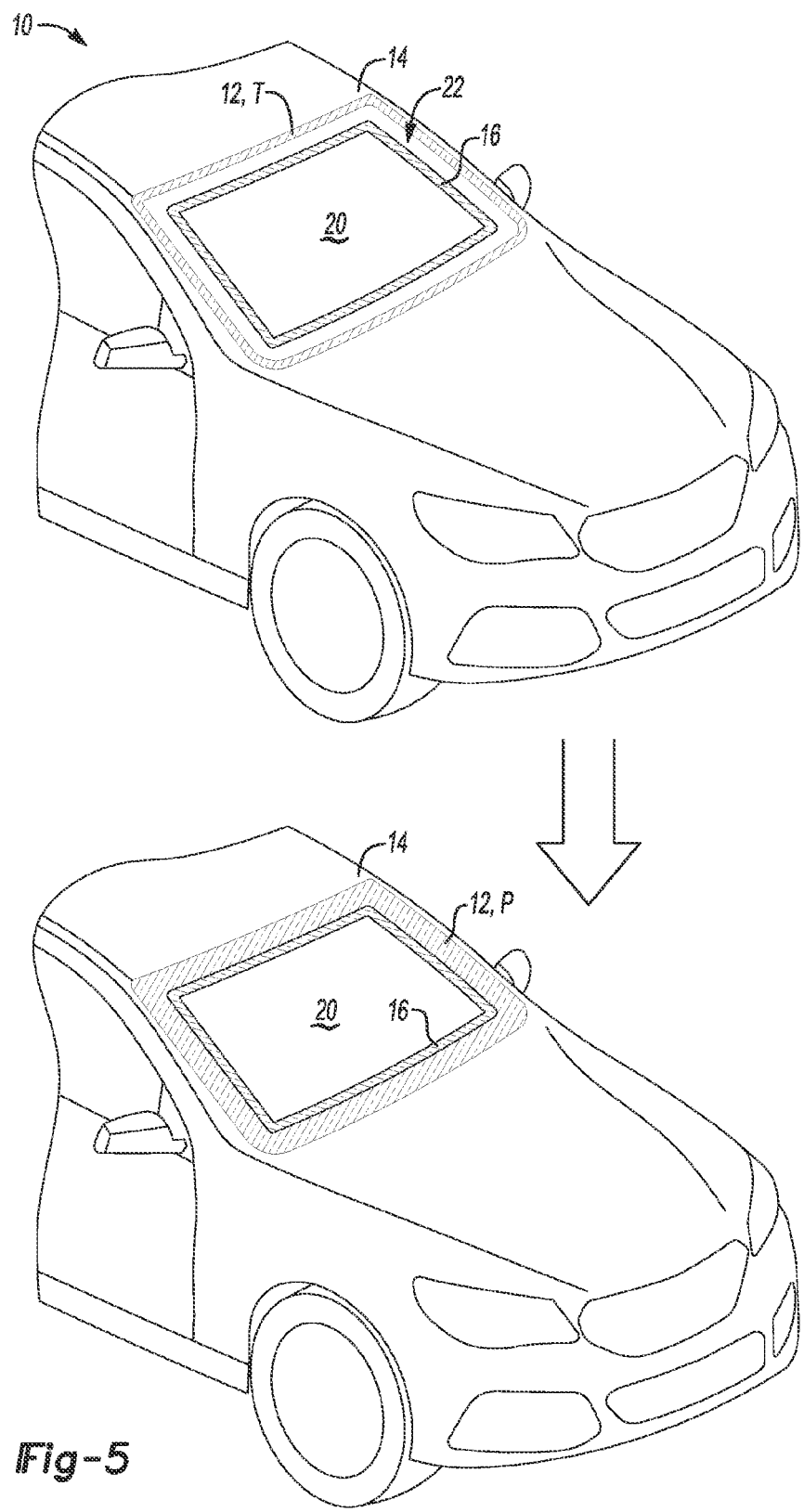
FIG. 5 is a semi-schematic, perspective view of another example of a fit and finish method for installing a windshield.

In the examples shown in FIGS. 4-6 the temporary shape T of the SMP 12 has already been set according to any of the examples previously described. These figures illustrate different examples of how the gap(s) 22 between parts 14 and 20 may be filled with the SMP 12.

Referring now to FIG. 4, in the example of the fit and finish method shown, the SMP 12 in its temporary shape T surrounds the entire perimeter of the part 14. In this example, setting the temporary shape T may include heating the SMP 12 to achieve the low modulus state and then forcing the SMP around the part 14. As illustrated, the part 14 fits into the other part 20 and gap(s) 22 exits between the two parts 14, 20. In order for the part 14 with the SMP 12 in its temporary shape T to fit into the part 20, the temporary shape T may extend in a direction perpendicular to the plane of the paper.

The SMP 12, T and the part 14 are installed in the part 20. As mentioned above, the spaces or gaps 22 exist between the SMP 12, T and part 20. In this example, one of the gaps has a consistent width W, and the other of the gaps has a varying width ranging from $W_1 \ldots W_x$ with $W_x$ being narrower than $W_1$. The varying width of the gap 22 may be a constant increase or decrease in width, or may be random variations.

The SMP 12 in its temporary shape is then reheated to the switching temperature, causing the SMP 12 to begin to revert back to the permanent shape P. When the SMP 12 reverts back to the permanent shape P, the SMP 12 fills in the gaps or spaces 22 between the parts 14, 20. As previously described, the part 20 may prevent the SMP 12 from fully reverting back to the permanent shape P, but it will contact the reverting SMP 12 and the gaps or spaces 22 will be closed. When full reversion is not achieved, the new shape of the SMP 12 (shown on the right hand side of FIG. 4) may be locked in by allowing the SMP 12 to cool below the switching temperature.

Referring now to FIG. 5, still another example of the fit and finish method is depicted. In this example, the part 14 includes the A pillars, the roof, and the cowl of the vehicle 10 and the part 20 is the windshield. The SMP 12 in its temporary shape T has been attached to the part 14.

In this example, a non-SMP lace strip 16 is used as a trim piece along the edge or perimeter of the windshield 20. The non-SMP lace strip 16 may be any non-shape memory material, such as nylon (i.e., synthetic polyamides). The non-SMP lace strip 16 may be adhered to the windshield edge via an adhesive, or may simply be held in place (e.g., by a robotic arm) until the SMP 12 locks the non-SMP lace strip 16 into place.

The SMP 12 in its temporary shape T is heated to the switching temperature, which causes the SMP 12 to initiate reversion back to the permanent shape P. In this example, the permanent shape P is at least as wide as the gap 22 between the two parts 14, 20 so that the SMP 12 will push the non-SMP lace strip 16 against the part 14. The at least partially reverted SMP 12 effectively holds the non-SMP lace strip 16 and the part 14 together. The permanent shape P may not be able to be completely recovered due to the its width and the presence of the non-SMP lace strip 16. When prevented from fully reverting, the new shape of the SMP 12 may be locked in by allowing the SMP 12 to cool below the switching temperature. It is to be understood that the non-SMP lace strip 16 could alternatively be an SMP lace strip that completely fills the gap 22 (and thus SMP 12 would not be utilized).

FIG. 6 illustrates another example in which a non-SMP lace strip 16 is utilized in conjunction with an SMP 12, which in this example is an SMP coating 12' on a portion of the non-SMP lace strip 16. In this example, the gap 22 between the parts 14, 20 faces an exterior E of the vehicle in which the parts 14, 20 are used, and it may be undesirable for the SMP 12 to be exposed to exterior conditions. As such, the non-SMP lace strip 16 may be positioned adjacent to the parts 14, 20 on the exterior E, but have the SMP coating 12' formed on a portion of the non-SMP lace strip 16 that faces the interior I and is located in the gap 22.

As illustrated in FIG. 6, the SMP coating 12' in its temporary shape T (which may be set according to any of the examples provided herein) is heated above the switching temperature, which causes the SMP coating 12' to revert back to its permanent shape P. In this example, the permanent shape P is completely recovered and fills the gap 22. It is to be understood that in any of the examples disclosed herein, the SMP 12, 12' may again be heated to the switching temperature in order to remove or reshape the SMP 12, 12' and/or to remove any of the adjacent parts 14 and/or 20.

It is to be understood that the ranges provided herein include the stated range and any value or sub-range within the stated range. For example, a range of 0° C. to 150° C. should be interpreted to include not only the explicitly recited limits of 0° C. to 150° C., but also to include individual values, such as 5° C., 50.5° C., 100° C., etc., and sub-ranges, such as from 10° C. to 125° C.; from 50° C. to 75° C., etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A fit and finish method, comprising:
   positioning non-overlapping ends of a first part and a second part adjacent to one another such that a shape memory polymer in a temporary shape is adjacent to a gap between the non-overlapping ends of the first part and the second part; and
   heating the shape memory polymer to a switching temperature of the shape memory polymer, thereby causing the shape memory polymer to initiate conversion to a permanent shape so that the shape memory polymer extends into the gap to close the gap between the non-overlapping ends of the first part and the second part.

2. The fit and finish method as defined in claim 1 wherein prior to positioning the first part and the second part, the method further comprises setting the temporary shape of the shape memory polymer by:
   heating the shape memory polymer to the switching temperature;
   applying a force to the heated shape memory polymer to conform the heated shape memory polymer to the temporary shape which is bent at an angle from an axis of the gap; and
   cooling the shape memory polymer in the temporary shape below the switching temperature, thereby setting the shape memory polymer in the temporary shape.

3. The fit and finish method as defined in claim 1, further comprising:
   inserting a non-shape memory material lace strip into the gap before positioning the first part and the second part; and
   locking the non-shape memory material lace strip in the gap upon initiating the conversion of the shape memory polymer to the permanent shape.

4. The fit and finish method as defined in claim 1 wherein:
   the shape memory polymer is attached to at least a portion of a perimeter of the first part; and
   the shape memory polymer in the permanent shape has a beveled edge that conforms to a beveled edge of a mating surface of the second part to form a seam between the first part and the second part.

5. The fit and finish method as defined in claim 1 wherein prior to positioning the first part and the second part, the method further comprises setting the temporary shape of the shape memory polymer by:
   heating the shape memory polymer to the switching temperature;
   applying a force to the heated shape memory polymer to conform the heated shape memory polymer to the temporary shape which has a dimension in a cross gap direction that is smaller than a dimension in the cross gap direction of the permanent shape; and cooling the shape memory polymer in the temporary shape below the switching temperature, thereby setting the shape memory polymer in the temporary shape.

6. The fit and finish method as defined in claim 1 wherein:

the shape memory polymer is a shape memory polymer foam that is incorporated into an adjustable cap that is attached to the first part; and prior to positioning the first part and the second part, the method further comprises setting the temporary shape of the shape memory polymer by:
  heating the shape memory polymer foam to the switching temperature;
  applying a force to the adjustable cap to conform the heated shape memory polymer foam to the temporary shape which has a dimension in a cross gap direction that is smaller than a dimension in the cross gap direction of the permanent shape; and
  cooling the shape memory polymer foam in the temporary shape below the switching temperature, thereby setting the shape memory polymer foam in the temporary shape.

7. A fit and finish method, comprising:

heating a shape memory polymer in its temporary shape to a switching temperature of the shape memory polymer, thereby initiating a conversion of the shape memory polymer to a permanent shape; and while the conversion is taking place, installing the shape memory polymer between non-overlapping ends of a first part and a second part so that when the shape memory polymer attempts to convert to the permanent shape, the shape memory polymer fills a gap between the non-overlapping ends of the first and second parts.

8. The fit and finish method as defined in claim 7 wherein:

prior to heating, the method further includes attaching the shape memory polymer in its temporary shape to a perimeter of the first part; and installing the shape memory polymer between the first part and the second part includes inserting the first part having the shape memory polymer thereon into the second part.

9. The fit and finish method as defined in claim 7 wherein the shape memory polymer is a lace strip.

10. The fit and finish method as defined in claim 7 wherein:

the shape memory polymer is a band having a cap attached thereto;

prior to heating, the method further includes attaching the shape memory polymer in its temporary shape to an end of the first part; and installing the shape memory polymer between the first part and the second part includes inserting the first part relative to the second part so that when the permanent shape is obtained, the cap is moved into contact with the second part.

11. The fit and finish method as defined in claim 7 wherein the shape memory polymer is a lace strip, and wherein prior to heating, the method further includes setting the temporary shape by:
  heating the shape memory polymer to the switching temperature;
  applying a force to the heated shape memory polymer to conform the heated shape memory polymer to a desired shape for the temporary shape; and
  cooling the shape memory polymer below the switching temperature, thereby setting the shape memory polymer in the temporary shape.

12. The fit and finish method as defined in claim 11 wherein the temporary shape for the lace strip is narrower than the gap between the non-overlapping ends of the first and second parts.

13. The fit and finish method as defined in claim 11 wherein installing the shape memory polymer between the non-overlapping ends of the first part and the second part includes inserting the lace strip between the non-overlapping ends of the first and second parts so that when the permanent shape is obtained, the lace strip is moved into contact with the non-overlapping ends of the first part and the second part.

14. The fit and finish method as defined in claim 7 wherein the shape memory polymer is a coating on at least a portion of a non-shape memory material lace strip, and wherein prior to heating, the method further includes setting the temporary shape by:
  heating the shape memory polymer to the switching temperature;
  applying a force to the heated shape memory polymer to place the heated shape memory polymer on a surface of the non-shape memory material lace strip and to conform the heated shape memory polymer to a shape of the at least the portion of the non-shape memory material lace strip; and
  cooling the shape memory polymer below the switching temperature, thereby setting the shape memory polymer in the temporary shape.

15. The fit and finish method as defined in claim 14 wherein the shape of the at least the portion of the lace strip is narrower than the gap between the non-overlapping ends of the first and second parts.

16. The fit and finish method as defined in claim 14 wherein installing the shape memory polymer between the non-overlapping ends of the first part and the second part includes inserting the at least the portion of the non-shape memory material lace strip having the shape memory polymer coating thereon between the non-overlapping ends of the first part and the second part.

17. The fit and finish method as defined in claim 3 wherein:
  the first part is a windshield;
  the non-shape memory material lace strip is a trim piece along a perimeter of the windshield; and
  the second part includes A pillars, a roof, and a cowl of a vehicle.

* * * * *